S. W. GOOCH.
CHIPPING OR HAMMERING TOOL.
APPLICATION FILED NOV. 11, 1911. RENEWED NOV. 16, 1912.
1,048,685.
Patented Dec. 31, 1912.
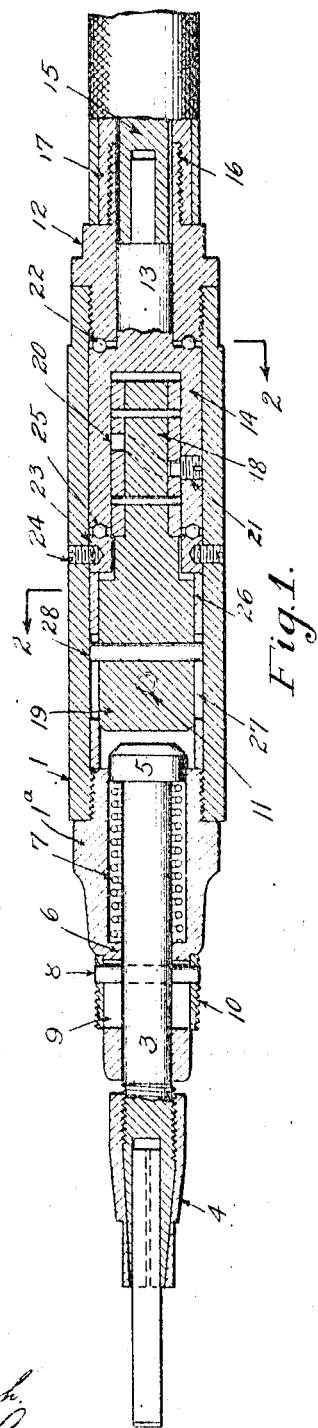
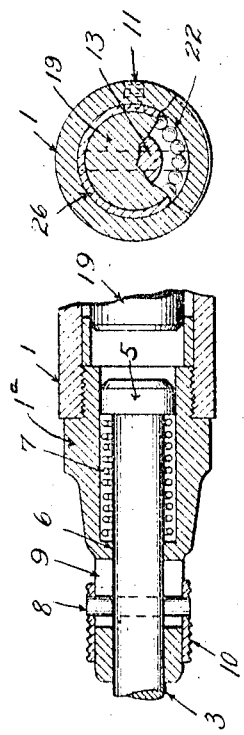
WITNESSES
INVENTOR

UNITED STATES PATENT OFFICE.

SHADE W. GOOCH, OF NEW BRIGHTON, PENNSYLVANIA, ASSIGNOR TO THE GOOCH-KOEHLER SPECIALTY MANUFACTURING COMPANY, OF ROCHESTER, PENNSYLVANIA, A CORPORATION OF PENNSYLVANIA.

CHIPPING OR HAMMERING TOOL.

1,048,685.  Specification of Letters Patent.  Patented Dec. 31, 1912.

Application filed November 11, 1911, Serial No. 659,712. Renewed November 16, 1912. Serial No. 731,875.

*To all whom it may concern:*

Be it known that I, SHADE W. GOOCH, a resident of New Brighton, in the county of Beaver and State of Pennsylvania, have invented a new and useful Improvement in Chipping or Hammering Tools, of which the following is a specification.

This invention relates to hammering or percussion tools or implements, such as chipping hammers, riveting hammers, and other tools or implements for a similar purpose.

The object of the invention is to provide a mechanically driven implement adapted to give a blow, which is capable of being operated at a very high speed, is substantially free from wear, and which can be conveniently held and operated.

The invention comprises the construction and arrangement of parts hereinafter described and claimed.

In the accompanying drawing Figure 1 is a longitudinal section through the implement; Fig. 2 is a transverse section thereof on the line 2—2, Fig. 1; and Fig. 3 is a longitudinal section through the forward part of the implement showing the tool shank partly pushed out.

The implement illustrated has all of the operating mechanism inclosed within a casing or shell 1, which is of general cylindrical form, and which is preferably knurled or roughened on the exterior so that it can be securely grasped and held. The casing preferably tapers somewhat at its forward end, and is provided in said end with an opening of reduced size through which the tool holding shank or plunger 3 projects. This shank or plunger is provided with a suitable tool holder, chuck or the like, indicated at 4, and which may be of any suitable or desirable construction, and need not be explained. This holder is adapted to hold any suitable tool, such as a chisel for chipping or mortising, a rivet set for riveting, or for that matter a drill or other desired tool.

The tool holding shank or plunger 3 at its inner end is provided with an enlargement 5 and interposed between the same and an internal shoulder 6 is a helical spring 7, arranged to hold the tool holding shank or plunger in its inward or retracted position. The portion of the implement carrying the tool holder or plunger may, if desired, be an integral part of the casing 1, but preferably is in a separate part 1ª connected to the casing 1 by a threaded connection, as shown in Fig. 1. The spring 7 is so arranged that when the plunger is held in its inward or retracted position its inner end projects slightly into the chamber in the casing 1, as shown in Fig. 1. Said shank or plunger is held against rotation and limited in its reciprocal movement by means of a pin 8 extending therethrough and through diametrically oppositely located slots 9 in the casing extension; and has its end secured to a sleeve 10 slidable on said extension and roughened or knurled on its exterior so that it can be firmly grasped, and by means of which the tool holding plunger can be pushed outwardly so that its inner end no longer projects into the chamber in the casing or shell 1, as shown in Fig. 3, as is done when it is desired to keep the tool from being acted upon by the hammer hereinafter described.

The rear end of the casing is closed by means of a bushing or plug 12 which is threaded into the casing and is provided with a central opening through which projects the shank 13 of the rotating driving shell or cylinder 14. This shank at its outer end is square or otherwise formed to have coupled thereto a driver, shown as a flexible shaft 15. The bushing or plug 12 at its outer end is reduced and externally threaded, as at 16, and adapted to have secured thereto the casing 17 of the flexible shaft.

Within the rotating shell or cylinder 14, and having a fairly close fit therein, is a reciprocating hammering member or plunger 18 whose outer end 19 forms a hammer adapted to deliver blows on the inner end 5 of the tool holding shank or plunger. The member 18 has a spiral cam connection with the rotating cylinder 14. As shown, the plunger is provided with two sleeves rigidly secured thereto and separated by a spiral cam groove 20, which is shown arranged to give a single backward and forward reciprocation to the plunger for each rotation of the cylinder 14. This cam groove is engaged by a stud 21 threaded in the cylinder 14 and projecting radially inwardly into the cam groove. Consequently the rotation of the cylinder 14 imparts positive movement to the hammer plunger in both directions.

The shell or cylinder 14 has a thrust bearing against the inner end of the bushing or plug 12, and interposed between the same is a ball bearing 22. At its other end said cylinder or shell has a thrust bearing against a collar 23 fixed in the casing by means of studs or screws 24 threaded through the casing, and between said collar and the shell or cylinder is a ball bearing 25. The races for the ball bearing are formed respectively in the collar 23 and in the end of the cylinder 14. Surrounding the outer end of the hammer plunger is a sleeve 26 which bears against the inner end of the forward extension 1ª of the casing, and also has bearing at its inner end against the collar 23, this sleeve serving as an additional means to prevent movement of the collar 23. The sleeve 26 is held from turning by a screw 11 tapped through shell 1 and is provided on diametrically opposite sides with slots 27 into which project the ends of a pin 28 passing through the hammer plunger, and which pin holds the hammer plunger against rotation, as is necessary in order to make the spiral cam connection with the rotating shell or cylinder 14 effective.

In the use of the implement a tool of the desired kind is secured in the tool chuck, and a flexible shaft or similar driving means is connected to the rear end of the implement. The implement is handled by merely grasping the casing or barrel 1 with the hand, and as the whole tool is very compact and of substantially cylindrical form without external projection it can be readily guided. The flexible shaft imparts rotary movement to the cylinder or shell 14, and this through the spiral cam connection described imparts a positive reciprocating movement to the hammer plunger, the latter being held against rotation by means of pin 28 moving in slots 27 in sleeve 26. The hammer plunger when projected forwardly strikes against the inner end of the tool shank or plunger, thereby driving the same forward and when the hammer plunger moves backwardly the spring 7 retracts the tool shank or plunger. In this manner positive blows are imparted to the tool, and since the hammer is positively moved in both directions a very high speed can be imparted thereto, much higher than when springs are used for either retracting the hammer plunger or projecting the same forward to strike the blow.

When the tool is lifted from the work it is desirable to stop the noise occasioned by the hammer plunger hitting the tool carrying shank or plunger. This is effected by means of the sleeve 10, which is grasped by the thumb and forefinger of the same hand which holds the tool, and by shoving said sleeve forwardly through the pin 8 connected to the tool carrying shank or plunger the latter is pushed outwardly until its inner end is no longer in position to be contacted by the hammer plunger, as seen in Fig. 3. Consequently, while the tool is not in contact with the work all noise is prevented, the hammer plunger merely reciprocating idly in the barrel.

The implement described is of simple and compact construction, can be very easily handled and operated and can be driven from any suitable source of mechanical power, and is therefore adapted to all places where power is available. Hammering tools, such as chipping hammers and riveting hammers, have heretofore been largely operated by compressed air, which is objectionable on account of the large loss in distributing the air and the expense of compressing the same.

The present invention provides an implement which will take the place of the usual pneumatic hammering implements and which is much more economical to operate.

What I claim is:

1. In a hammering implement, the combination of a cylindrical casing, a head closing one end thereof, a tool-holding plunger projecting from the other end of the casing and into the casing chamber and reciprocally mounted therein, a spring arranged to move said plunger inwardly, a fixed collar in the casing, a rotary driving member in the casing intermediate its ends having a driving connection through one end of the casing and having a thrust bearing at one end against the inner end of said head and at its opposite end against said fixed collar, a reciprocating member held against rotation in alinement with the rotary member and arranged when projected to strike the end of the tool-holding plunger, and interengaging spiral operating connections directly connecting the rotating and reciprocating members and arranged to positively project and retract said reciprocating member.

2. In a hammering implement, the combination of a cylindrical casing, a head closing one end thereof, a tool-holding plunger projecting from the other end of the casing and into the casing chamber and reciprocally mounted therein, a spring arranged to move said plunger inwardly, a fixed collar in the casing, a rotary driving member in the casing intermediate its ends having a driving connection through one end of the casing and having a thrust bearing at one end against the inner end of the head and at its opposite end against said fixed collar, ball bearings between the ends of said rotary driving member and said head and collar, a reciprocating member held against rotation and projecting into the rotary member and arranged when projected to strike the end of the tool-holding plunger, and inter-engaging spiral operating connections directly connecting the rotating and reciprocating members and arranged to positively project and retract said reciprocating member.

In testimony whereof, I have hereunto set my hand.

SHADE W. GOOCH.

Witnesses:
L. P. BETTS,
AMELIA S. KOEHLER.